US008923280B2

(12) United States Patent
Kim et al.

(10) Patent No.: US 8,923,280 B2
(45) Date of Patent: Dec. 30, 2014

(54) METHOD AND APPARATUS FOR SELECTING DOMAIN FOR VOICE CALL CONTINUITY IN MOBILE COMMUNICATION SYSTEM

(75) Inventors: Ju Young Kim, Osan-si (KR); Su Jin Bae, Suwon-si (KR); Young Ki Jeon, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 373 days.

(21) Appl. No.: 13/399,809

(22) Filed: Feb. 17, 2012

(65) Prior Publication Data

US 2012/0213132 A1 Aug. 23, 2012

(30) Foreign Application Priority Data

Feb. 18, 2011 (KR) ........................ 10-2011-0014727

(51) Int. Cl.
*H04L 12/66* (2006.01)
*H04L 29/06* (2006.01)
*H04W 48/18* (2009.01)

(52) U.S. Cl.
CPC ............. *H04W 48/18* (2013.01); *H04L 65/104* (2013.01); *H04L 65/103* (2013.01); *H04L 65/1016* (2013.01)
USPC ............................ 370/352; 370/355; 370/356

(58) Field of Classification Search
CPC ......... H04L 65/00; H04L 45/00; H04L 45/04; H04L 45/306; H04L 45/3065; H04L 45/308; H04L 2012/64; H04L 12/64; H04L 65/102; H04L 29/06176; H04L 12/50; H04L 49/15
USPC ......... 370/310, 328, 351, 352, 353, 354, 355, 370/356, 357, 360, 386
See application file for complete search history.

(56) References Cited

U.S. PATENT DOCUMENTS

2007/0183410 A1* 8/2007 Song et al. .................... 370/352
2007/0201662 A1* 8/2007 Song et al. ............... 379/201.01
2007/0238468 A1* 10/2007 Buckley et al. ............... 455/445

* cited by examiner

*Primary Examiner* — Chi H Pham
*Assistant Examiner* — Weibin Huang

(57) ABSTRACT

A method and an apparatus select a domain of an application server in order to support a voice call continuity service in a mobile communication system including an IP Multimedia Subsystem (IMS) domain and a Circuit Switched (CS) domain. The method includes selecting either the IMS domain or the CS domain according to a dynamic domain selection priority which is predetermined corresponding to a terminal when a voice call for the terminal is received. The method also includes anchoring the received voice call corresponding to the terminal through the selected domain. A voice call establishment for a terminal using first the most recent domain which is used for a voice call in a mobile communication system is initiated. Thus, it is possible in a mobile communication system to increase the domain selecting completion rates for a voice call service corresponding to a terminal.

20 Claims, 6 Drawing Sheets

METHOD AND APPARATUS FOR SELECTING DOMAIN FOR VOICE CALL CONTINUITY IN MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Feb. 18, 2011 and assigned Serial No. 10-2011-0014727, the entire disclosure of which is hereby incorporated by reference.

TECHNICAL FIELD OF THE INVENTION

The present disclosure relates to a communication method and apparatus in a mobile communication system, and more particularly, to a method and an apparatus for selecting a domain for voice call continuity (VCC).

BACKGROUND OF THE INVENTION

In response to rapid development of mobile communication and Internet technology and various demands of subscribers, a recent mobile communication service has been developed to provide a high speed packet data service through which it is possible to transmit e-mails or large amounts of digital data such as a still picture as well as to provide voice communication service. Consequently, the mobile communication system progresses from a circuit switched (CS) domain for voice communication to a packet switched domain for packet communication.

Further, a core network for providing a multimedia service through the Internet has been changed from the prior packet switched basis to a packet basis and gradually progresses on the basis of an Internet protocol. The communication system which provides an IP multimedia service (IMS) through an IP based core network to a subscriber is called an IP multimedia subsystem. Various studies for providing all IP service through IMS have progressed in 3GPP (Third Generation Partnership Project)/3GPP2.

As a circuit switched method is used for typical voice and real time service, it means a way of forming a fixed communication route based on a circuit between a user and his counterparty. Because the IMS uses an unfixed communication route based on a packet to increase a transmitting efficiency and ensure stability, the IMS is suitable for a data service, a messaging service and a file transmission service. The IMS is able to support a connection, which the plurality of users participate in, as well as a simple one-to-one telephonic communication. Such a packet switched (PS) domain may be called the IMS domain.

The IMS may include a group of a signaling and a bearer which are related to network elements, and approach a Web-based technique for a voice, a video, message data, and a wireless subscriber. Because the IMS provides the various types of packet data services based on the IP transmission protocol, IMS users can exchange a multimedia type of contents, such as a picture, a video clip, a sound clip, and the like, through session based messages with one another.

As the VCC service is a technique proposed for transferring a voice call between the CS domain and the IMS domain through domain transfer (DT), it is provided to a subscriber subscribed to the VCC service as a home IMS application. A terminal is called a VCC terminal, which can seamlessly change its domain of a call between the CS domain and the IMS domain.

Further, for providing the VCC service, an application server (AS) for the VCC service is provided in the IMS domain. The VCC service is classified into two functions, where the first function is a domain selection for a terminal and the second function is a domain switching. That is, in the VCC service, a voice call request is transferred through the CS domain or the IMS domain to a terminal. The VCC AS selects either the CS domain or the IMS domain corresponding to the terminal, thereby providing an anchoring for the voice call. Furthermore, the VCC AS provides a domain switching such that the voice call service provided through the CS domain is provided through the IMS domain, or the voice call service provided through the IMS domain is provided through the CS domain.

However, it is difficult to cause the VCC AS to select a domain for a voice call service corresponding to a certain terminal. That is, it is difficult to cause the VCC AS to select a domain to successfully provide a voice call service to a terminal. Consequently, there is a problem of decreasing a domain selection completion rate for a voice call service in the VCC AS. Furthermore, since the voice call service is not smoothly provided to a terminal in a mobile communication system, there is a problem of wasting resources for the voice call service.

SUMMARY OF THE INVENTION

To address the above-discussed deficiencies of the prior art, it is a primary object to provide a method and an apparatus for selecting a domain for voice call continuity which can effectively provide a voice call service to a terminal in a mobile communication system, such as to prevent a waste of resources for a voice call service.

The present disclosure further provides a method and an apparatus for selecting a domain for voice call continuity which can increase a domain selecting completion rate for a voice call service.

In accordance with an aspect of the present disclosure, a method of selecting a domain of an application server in order to support a voice call continuity service in a mobile communication system including an IP Multimedia Subsystem (IMS) domain and a Circuit Switched (CS) domain is provided. The method includes selecting either the IMS domain or the CS domain according to a dynamic domain selection priority which is predetermined corresponding to a terminal when a voice call for the terminal is received. The method also includes anchoring the received voice call corresponding to the terminal through the selected domain.

Selecting either the IMS domain or the CS domain includes requesting a termination to the selected domain and, when the termination is completed in the selected domain, maintaining the dynamic domain selection priority of the selected domain. Selecting either the IMS domain or the CS domain includes, when the termination fails in the selected domain, reselecting the other of the IMS domain and the CS domain; requesting a termination to the reselected domain; and when the termination is completed in the reselected domain, changing the dynamic domain selection priority from the selected domain to the reselected domain. Requesting a termination to the selected domain is performed when the terminal is connected to the selected domain. Selecting either the IMS domain or the CS domain includes reselecting the other of the IMS domain and the CS domain when the terminal is not connected to the selected domain.

In accordance with another aspect of the present disclosure, an apparatus for selecting a domain of an application server in order to support a voice call continuity service in a mobile communication system including an IP Multimedia Subsystem (IMS) domain and a Circuit Switched (CS) domain is provided. The apparatus includes a selector configured to select either the IMS domain or the CS domain according to a dynamic domain selection priority which is predetermined corresponding to a terminal when a voice call for the terminal is received. The apparatus also includes an anchoring unit configured to anchor the received voice call corresponding to the terminal through the selected domain.

The selector requests a termination to the selected domain and maintains the dynamic domain selection priority of the selected domain when the termination is completed in the selected domain. The selector reselects the other of the IMS domain and the CS domain when the termination fails in the selected domain, requests a termination to the reselected domain, and changes the dynamic domain selection priority from the selected domain to the reselected domain when the termination is completed in the reselected domain. The selector requests the termination to the selected domain when the terminal is connected to the selected domain. The selector reselects the other of the IMS domain and the CS domain when the terminal is not connected to the selected domain.

Before undertaking the DETAILED DESCRIPTION OF THE INVENTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter Of the present disclosure.

Figure 1:
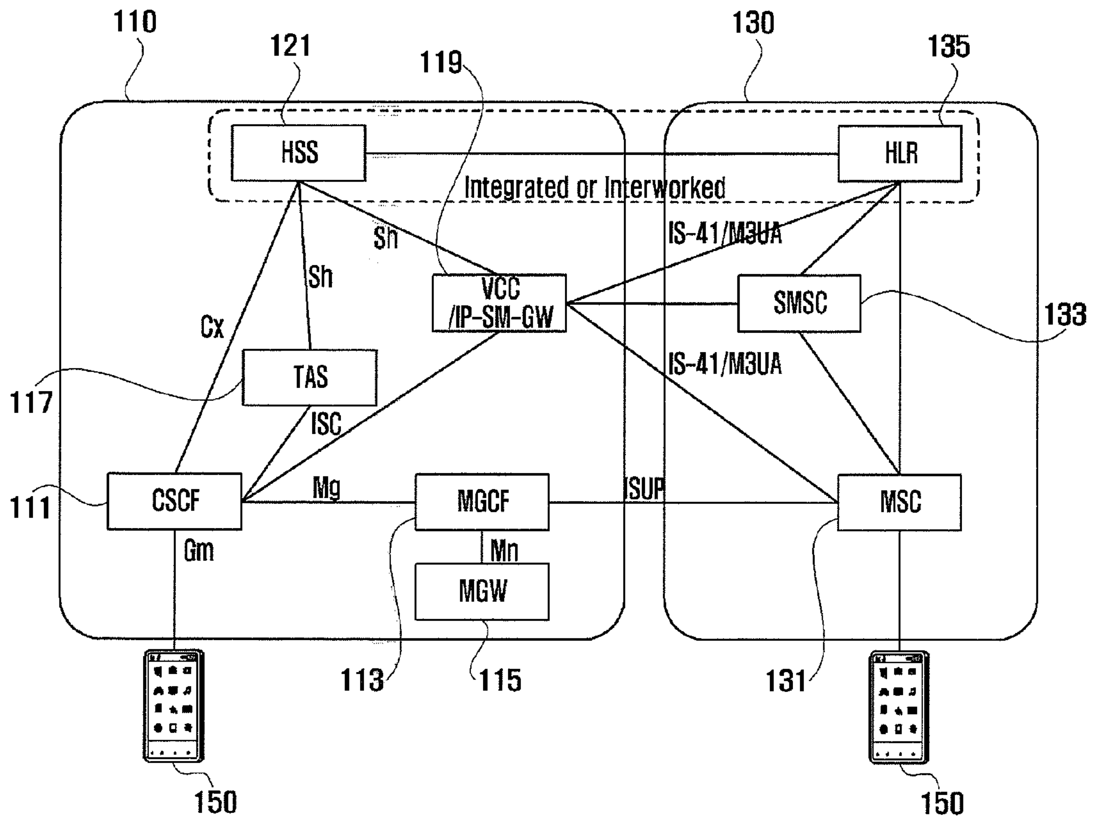
FIG. 1 illustrates a configuration of a mobile communication system according to an embodiment of the present disclosure.

Referring to FIG. 1, a mobile communication system for voice call continuity (VCC) includes an IMS domain 110 and a CS domain 130. A VCC terminal 150 supports both the IMS domain 110 and the CS domain 130. The VCC terminal 150 can perform a domain switch between the IMS domain 110 and the CS domain.

The IMS domain 110 includes a call session control function (CSCF) 111, a media gateway control function (MGCF) 113, a media gateway (MGW) 115, a telephony service AS (TAS) 117, a VCC AS (or IP-short message-gateway (IP-SM-GW)) 119, and a home subscriber server (HSS) 121.

The CSCF 111 performs a function of processing a voice call in the IMS domain 110. The CSCF 111 may establish an IMS session with the VCC terminal 150. The MGCF 113 performs a function of supporting a voice call service between the IMS domain 110 and the CS domain 130. The MGW 115 performs a function of changing a voice call for a transmission and a reception with the IMS domain 110. The TAS 117 supports a voice call service in the IMS domain 110. That is, the TAS 117 supports a call between terminals in the IMS domain 110. The VCC AS 119 supports a VCC service for the VCC terminal 150.

The VCC AS 119 includes a selector and an anchoring unit. The selector selects either the IMS domain 110 or the CS domain 130 corresponding to the VCC terminal 150. The anchoring unit performs an anchoring to either the IMS domain 110 or the CS domain 130 corresponding to the VCC terminal 150. That is, the anchoring unit transfers a voice call through either the IMS domain 110 or the CS domain 130 to the VCC terminal 150. The VCC AS 119 allows a voice call for the VCC terminal 150 to move through a switching between the IMS domain 110 and the CS domain 130. The VCC AS 119 implements an IP-SM-GW, such that it performs a function of processing a short message in the IMS domain 110. The HSS 121 stores subscriber information about terminal users.

The CS domain 130 includes a mobile switching center (MSC) 131, a short message service center (SMSC) 133, and a home location register (HLR) 135.

The MSC 131 performs a function of processing a voice call in the CS domain 130. The MSC 131 may establish a CS session with the VCC terminal 150. The MSC 131 may support a voice call service between the IMS domain 110 and the CS domain 130. The SMSC 133 performs a function of processing a short message in the CS domain 130. The SMSC 133 may support a short message service between the IMS domain 110 and the CS domain 130. That is, when the VCC AS 119 implements the IP-SM-GW in the IMS domain 110, the SMSC 133 communicates with the IP-SM-GW to support the short message service. The HLR 135 stores subscriber information about terminal users.

Figure 2:
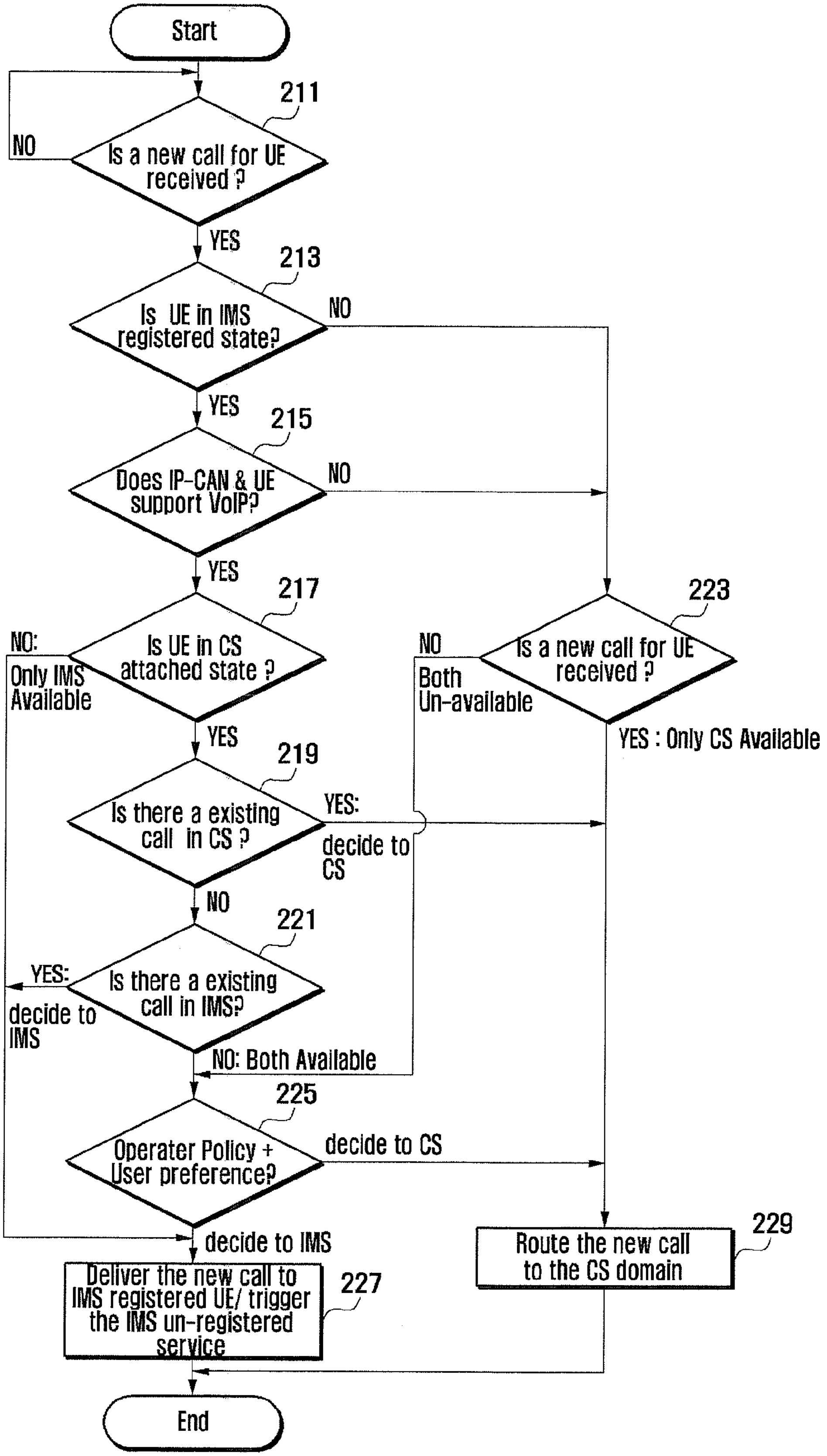
FIG. 2 illustrates a VCC service providing procedure according to one embodiment of the present disclosure.

FIG. 2 is a flowchart illustrating a method for providing VCC service according to one embodiment of the present disclosure.

Referring to FIG. 2, the VCC AS 119 first receives a new voice call for a terminal (block 211). When the voice call is received at block 211, the VCC AS 119 determines whether a corresponding terminal is registered with the IMS domain 110 (block 213). Then, the terminal connects with one of the plurality of CSCFs 111 and registers for the IMS domain 110. The VCC AS 119 may store connection information about correspondence between the VCC terminal 150 and the CSCF 111. Thus, the VCC AS 119 may determine whether the terminal connects with the CSCF 111 using the connection information; that is the terminal is registered with the IMS domain 110. Further, when it is determined that the terminal is registered with the IMS domain 110 at block 213, the VCC AS 119 determines whether a corresponding terminal is a VCC terminal (block 215). That is, the VCC AS 119 determines whether the terminal supports the VCC service.

Next, when the terminal is a VCC terminal at block 215, the VCC AS 119 may determine whether the corresponding terminal is in a connecting state with the CS domain 130 (block 217). If it is determined at block 217 that the terminal is not in a connecting state with the CS domain 130, the VCC AS 119 terminates the VCC providing procedure after transferring the voice call for the corresponding terminal through the IMS domain 110 (block 227). That is, because the terminal is registered with the IMS domain 110 and does not connect with the CS domain 130, the VCC AS 119 provides the voice call service through IMS domain 110 to the terminal.

When it is determined at block 217 that the terminal is connected to the CS domain 130 at block 217, the VCC AS 119 determines whether a CS session for the corresponding terminal is established in the CS domain 130 (block 219). That is, the VCC AS 119 determines whether the terminal is in a state of performing another voice call through the CS domain 130. When it is determined at block 219 that the CS session for the terminal is established in the CS domain 130, the VCC AS 119 terminates the VCC service providing method after routing the voice call for the corresponding terminal to the CS domain 130. That is, because though the terminal is registered with the IMS domain 110 and connects with the CS domain 130, the CS session corresponding to the terminal is previously set, the VCC AS 119 provides the voice call service through the CS domain 130 to the terminal.

When it is determined at block 219 that the CS session for the terminal is not established in the CS domain 130, the VCC AS 119 determines whether an IMS session for the corresponding terminal is established in the IMS domain 110 (block 221). That is, the VCC AS 119 determines whether the terminal performs another voice call through the IMS domain 110. When, at block 221, it is determined that the IMS session for the terminal is established in the IMS domain 110, the VCC AS 119 terminates the VCC service providing method after transferring the voice call for the corresponding terminal through the IMS domain 110 (227). That is, because though the terminal is registered with the IMS domain 110 and connects with the CS domain 130, the IMS session corresponding to the terminal is previously set, the VCC AS 119 provides the voice call service through the IMS domain 110 to the terminal.

When it is determined at block 213 that the terminal is not registered with the IMS domain 110 or that the terminal is not a VCC terminal at block 215, the VCC AS 119 determines whether the corresponding terminal is in a connecting state with the CS domain 130 (block 223). Then, the VCC AS 119 communicates with the CS domain 130 such that the VCC AS 119 may determine whether the terminal is in a connecting state with the CS domain 130. When it is determined at block 223 that the terminal is in the connecting state with the CS domain 130, the VCC AS 119 terminates the VCC service providing method after routing the voice call for the corresponding terminal to the CS domain 130. That is, because the terminal is not registered with the IMS domain 110 and is in the connecting state with the CS domain 130, the VCC AS 119 provides the voice call service through the CS domain 130 to the terminal.

When it is determined that the IMS session for the terminal is established in the IMS domain 110 at block 221 or the terminal is not in a connecting state with the CS domain 130 at block 223, the VCC AS 119 checks either the IMS domain 110 or the CS domain 130, which is set corresponding to the corresponding terminal based on an operator policy or user preference (block 225). That is, if the terminal is registered with the IMS domain 110 and does not connect with the CS domain 130, or the terminal is not registered with the IMS domain 110 and does not connect with the CS domain 130, the VCC AS 119 checks either the IMS domain 110 or the CS domain 130 which is set corresponding to the terminal.

Next, when the IMS domain 110 is set corresponding to the terminal at block 225, the VCC AS 119 terminates the VCC service providing method after transferring the voice call through the IMS domain 110 (block 227). That is, the VCC AS 119 provides the voice call service through the IMS domain 110 to the terminal. Alternatively, when the CS domain 130 is set corresponding to the terminal at block 225, the VCC AS 119 terminates the VCC service providing method after routing the voice call for the corresponding terminal to the CS domain 130 (block 229). That is, the VCC AS 119 provides the voice call service through the CS domain 130 to the terminal.

At block 227, after transferring the voice call for the terminal to the IMS domain 110, the VCC AS 119 may check whether the voice call is established between the IMS domain 110 and the terminal. Then, when the voice call is established between the IMS domain 110 and the terminal, the VCC AS 119 provides the voice call service through the IMS domain 110 to the terminal. Alternatively, when the voice call is not established between the IMS domain 110 and the terminal, the VCC AS 119 reselects the CS domain 130 corresponding to the terminal and routes the voice call to the CS domain 130. Then, the VCC AS 119 may check whether the voice call is established between the CS domain 130 and the terminal. When the voice call is established between the CS domain 130 and the terminal, the VCC AS 119 provides the voice call service through the CS domain 130 to the terminal. When the voice call is not established between the terminal and the CS domain 130 as well as the IMS domain 110, the VCC AS 119 determines that it may be impossible to use both the CS domain 130 and the IMS domain 110 corresponding to the terminal.

According to the embodiment of the present disclosure, in order to select either the IMS domain 110 or the CS domain 130, the VCC AS 119 takes various determination matters into account. The determination matters include whether a terminal is registered with the IMS domain 110, whether a terminal is connected to the CS domain 130, whether an IMS session for a terminal is established in the IMS domain 110, whether a CS session for a terminal is established in the CS domain 130, and user preferences and an operator policy set corresponding to a terminal.

Figure 3:
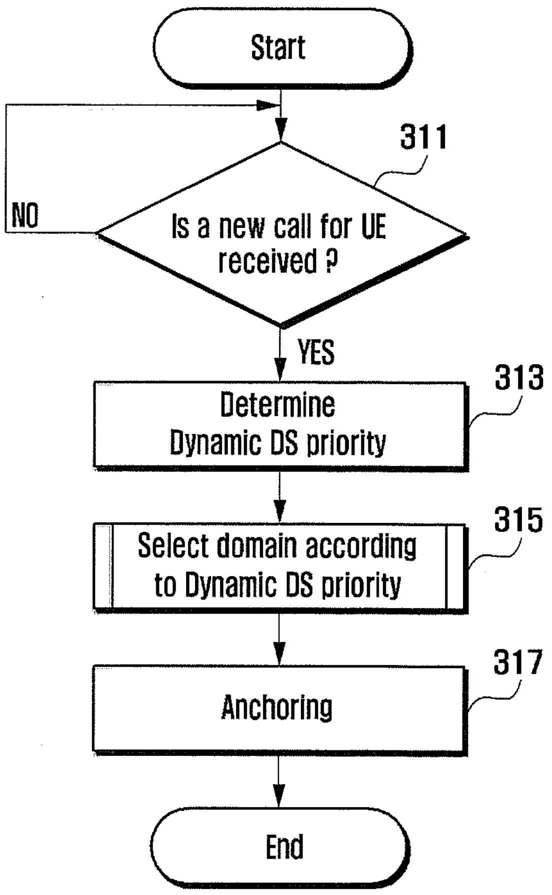
FIG. 3 illustrates a VCC service providing procedure according to another embodiment of the present disclosure.

FIG. 3 is a flowchart illustrating a method of providing a VCC service according to another embodiment of the present disclosure.

Referring to FIG. 3, the VCC AS 119 first receives a new voice call for a certain terminal (block 311). When the voice call is received at block 312, the VCC AS 119 checks a dynamic DS (domain selection) priority that is previously set corresponding to the certain terminal (block 313). The dynamic DS priority shows either the IMS domain 110 or the CS domain 130, which is recently used for a voice call service. The dynamic DS priority may be determined based on the most recent usages for receiving a voice call by the terminal and for originating a voice call, and the last used result for domain switching. That is, the VCC AS 119 stores and manages the dynamic DS priority which indicates either the IMS domain 110 or the CS domain 130, and checks it in response to a voice call reception.

Then, the VCC AS 119 selects either the IMS domain 110 or the CS domain 130 for the certain terminal according to the dynamic DS priority (block 315). The procedure of selecting either the IMS domain 110 or the CS domain 130 for the certain terminal by the VCC AS 119 is described in detail below with reference to FIG. 4 through FIG. 6. The VCC AS 119 performs an anchoring (block 317) and then terminates the voice service providing method. When the IMS domain 110 is selected corresponding to the terminal, the VCC AS 119 transfers the voice call for the terminal through the IMS domain 110. When the CS domain 130 is selected corresponding to the terminal, the VCC AS 119 routes the voice call for the terminal through the CS domain 130. That is, the VCC AS 119 provides the voice call service through either the IMS domain 110 or the CS domain 130 to the terminal.

Figure 4:
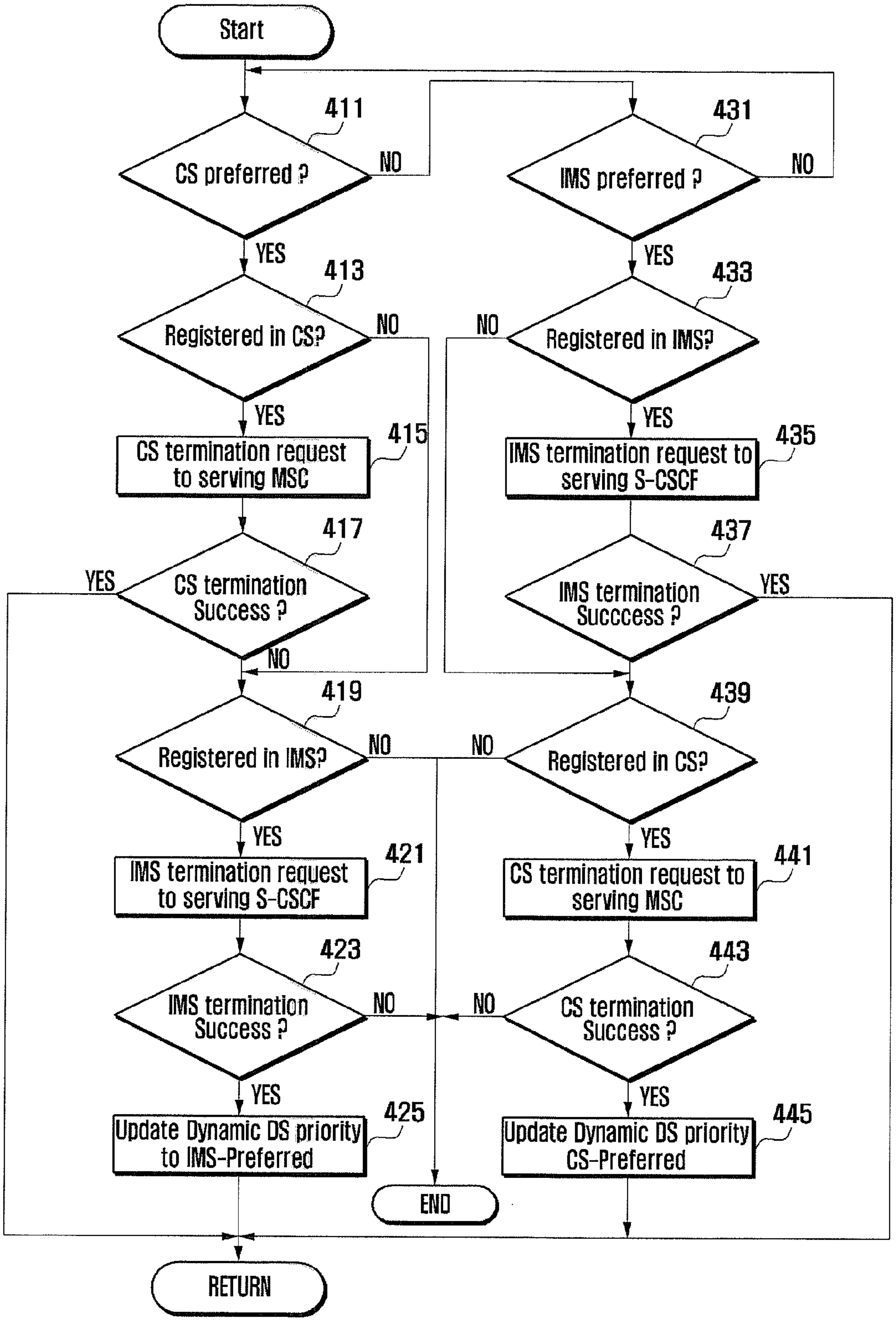
FIG. 4 illustrates a first example of a domain selecting procedure depicted in FIG. 3.

FIG. 4 is a flowchart illustrating a first example of the domain selecting procedure depicted in FIG. 3.

Referring to FIG. 4, the VCC AS 119 first determines whether the dynamic DS priority of the certain terminal corresponds to the CS domain 130 (block 411). When it is determined at block 411 that the dynamic DS priority of the terminal indicates the CS domain 130, the VCC AS 119 determines whether the terminal is in a connecting state with the CS domain 130 (block 413). The VCC AS 119 communicates with the CS domain 130, such that the terminal can determine whether the terminal is in a connecting state with the CS domain 130.

Next, when it is determined at block 413 that the terminal is in a connecting state with the CS domain 130, the VCC AS 119 requests a termination of the CS domain 130 from a serving MSC 131 of the terminal (block 415). That is, the VCC AS 119 requests an establishment of the voice call corresponding to the terminal from the serving MSC 131. Then, the VCC AS 119 determines whether the termination of the CS domain 130 is successful (block 417). When it is determined at block 417 that the termination of the CS domain 130 is successful, the VCC AS 119 returns to the procedure in FIG. 3. That is, the VCC AS 119 maintains the dynamic DS priority corresponding to the terminal as the CS domain 130.

When it is determined at block 413 that the terminal is not in a connecting state with the CS domain 130 or at block 417 that the termination of the CS domain 130 is not successful, the VCC AS 119 determines whether the certain terminal is registered with the IMS domain 110 (block 419). The terminal connects with one of the plurality of CSCFs 111 and may perform registering with the IMS domain 110. Then, the VCC AS 119 may store connection information about the CSCF 111 corresponding to the VCC terminal 150. Consequently, the VCC AS 119 may determine based on the connection information whether the terminal is connected to the CSCF 111. That is, whether the terminal is registered with the IMS domain 110.

Next, when it is determined at block 419 that the terminal is registered with the IMS domain 110, the VCC AS 119 requests a termination of the IMS domain 110 from a serving CSCF 111 of the terminal (block 421). That is, the VCC AS 119 requests an establishment of a voice call corresponding to the terminal from the serving CSCF 111. Then, the VCC AS 119 determines whether the termination of the IMS domain 110 is successful (block 423). When it is determined at block 423 that the termination of the IMS domain 110 is successful, the VCC AS 119 updates the dynamic DS priority of the terminal as the IMS domain 110 and returns to FIG. 3 (block 425). That is, the VCC AS 119 changes the dynamic DS priority from the CS domain 130 to the IMS domain 110 corresponding to the terminal.

When it is determined at block 419 that the terminal is not registered with the IMS domain 110 or at block 423 that the termination of the IMS domain 110 is not successful, the VCC AS 119 terminates the VCC service providing procedure. That is, if the terminations of the CS domain 130 and the IMS domain 110 all fail, the VCC AS 119 determines that it may be impossible to use the CS domain 130 and the IMS domain 110 corresponding to the terminal. Consequently, the VCC AS 119 does not perform anchoring for the voice call.

When it is determined at block 411 that the dynamic DS priority of the terminal does not correspond to the CS domain 130, the VCC AS 119 determines whether the dynamic DS priority of the terminal corresponds to the IMS domain 110 (block 431). When it is determined at block 431 that the dynamic DS priority of the terminal corresponds to the IMS domain 110, the VCC AS 119 determines whether the terminal is registered with the IMS domain 110 (block 433). The VCC AS 119 may store connection information about the CSCF 111 corresponding to the terminal. Consequently, the VCC AS 119 may determine based on the connection information whether the terminal is connected to the CSCF 111. That is, the terminal is registered with the IMS domain 110.

Next, when the terminal is registered with the IMS domain 110 at block 433, the VCC AS 119 requests a termination of the IMS domain 110 from the serving CSCF 111 of the terminal (block 435). That is, the VCC AS 119 requests an establishment of the voice call corresponding to the terminal from the serving CSCF 111. Then, the VCC AS 119 determines whether the termination of the IMS domain 110 is successful (block 437). When it is determined at block 437 that the termination of the IMS domain 110 is successful, the VCC AS 119 returns to FIG. 3. That is, the VCC AS 119 maintains the dynamic DS priority corresponding to the terminal as the IMS domain 110.

When it is determined at block 433 that the terminal is not registered with the IMS domain 110 or at block 437 that the termination of the IMS domain 110 is not successful, the VCC AS 119 determines whether the terminal is in a connecting state with the CS domain 130 (block 439). By communicating with the CS domain 130, the VCC AS 119 may determine whether the terminal is in a connecting state with the CS domain 130.

Next, when the terminal is connected to the CS domain 130 at block 439, the VCC AS 119 requests a termination of the CS domain 130 from the serving MSC 131 of the terminal (block 441). That is, the VCC AS 119 requests an establishment of the voice call corresponding to the terminal from the serving MSC 131. Then, the VCC AS 119 determines whether the termination of the CS domain 130 is successful (block 443). When it is determined at block 417 that the termination of the CS domain 130 is successful, the VCC AS 119 updates the dynamic DS priority of the terminal as the CS domain 130 (block 445) and returns to FIG. 3. That is, the VCC AS 119 changes the dynamic DS priority from the IMS domain 110 to the CS domain 130 corresponding to the terminal.

When it is determined at block 439 that the terminal is not connected to the CS domain 130 or at block 443 that the termination of the CS domain 130 is not successful, the VCC AS 119 terminates the VCC service providing procedure. That is, when the terminations of the IMS domain 110 and the CS domain 130 fail, the VCC AS 119 determines that it may be impossible to use the IMS domain 110 and the CS domain 130 corresponding to the terminal. Consequently, the VCC AS 119 does not perform the anchoring for the voice call.

According to the first example of this embodiment of the present disclosure, as shown in Table 1 below, the VCC AS 119 may set the dynamic DS priority according to a domain selecting result.

TABLE 1

| Dynamic DS Priority before domain selection | domain selection result | Dynamic DS Priority after domain selection |
|---|---|---|
| IMS preferred | IMS success or failure | IMS preferred |
| CS preferred | CS success | CS preferred |
| | CS success or failure | CS preferred |
| | IMS success | IMS preferred |

For example, when the IMS domain 110 is set as the dynamic DS priority, the VCC AS 119 first selects the IMS domain 110 corresponding to the terminal. When the termination of the IMS domain 110 is successful corresponding to the terminal, the VCC AS 119 maintains the dynamic DS priority of the terminal as the IMS domain 110. Alternatively, when the termination of the IMS domain 110 corresponding to the terminal fails, the VCC AS 119 reselects the CS domain 130 corresponding to the terminal. When the termination of the CS domain 130 is successful corresponding to the terminal, the VCC AS 119 changes the dynamic DS priority of the terminal from the IMS domain 110 to the CS domain 130.

When the dynamic DS priority of the terminal is set as the CS domain 130, the VCC AS 119 first selects the CS domain 130 corresponding to the terminal. When the termination of the CS domain 130 is successful corresponding to the terminal, the VCC AS 119 maintains the dynamic DS priority of the terminal as the CS domain 130. Alternatively, when the termination of the CS domain 130 corresponding to the terminal fails, the VCC AS 119 reselects the IMS domain 110 corresponding to the terminal. When the termination of the IMS domain 110 is successful corresponding to the terminal, the VCC AS 119 changes the dynamic DS priority of the terminal from the CS domain 130 to the IMS domain 130.

Figure 5:
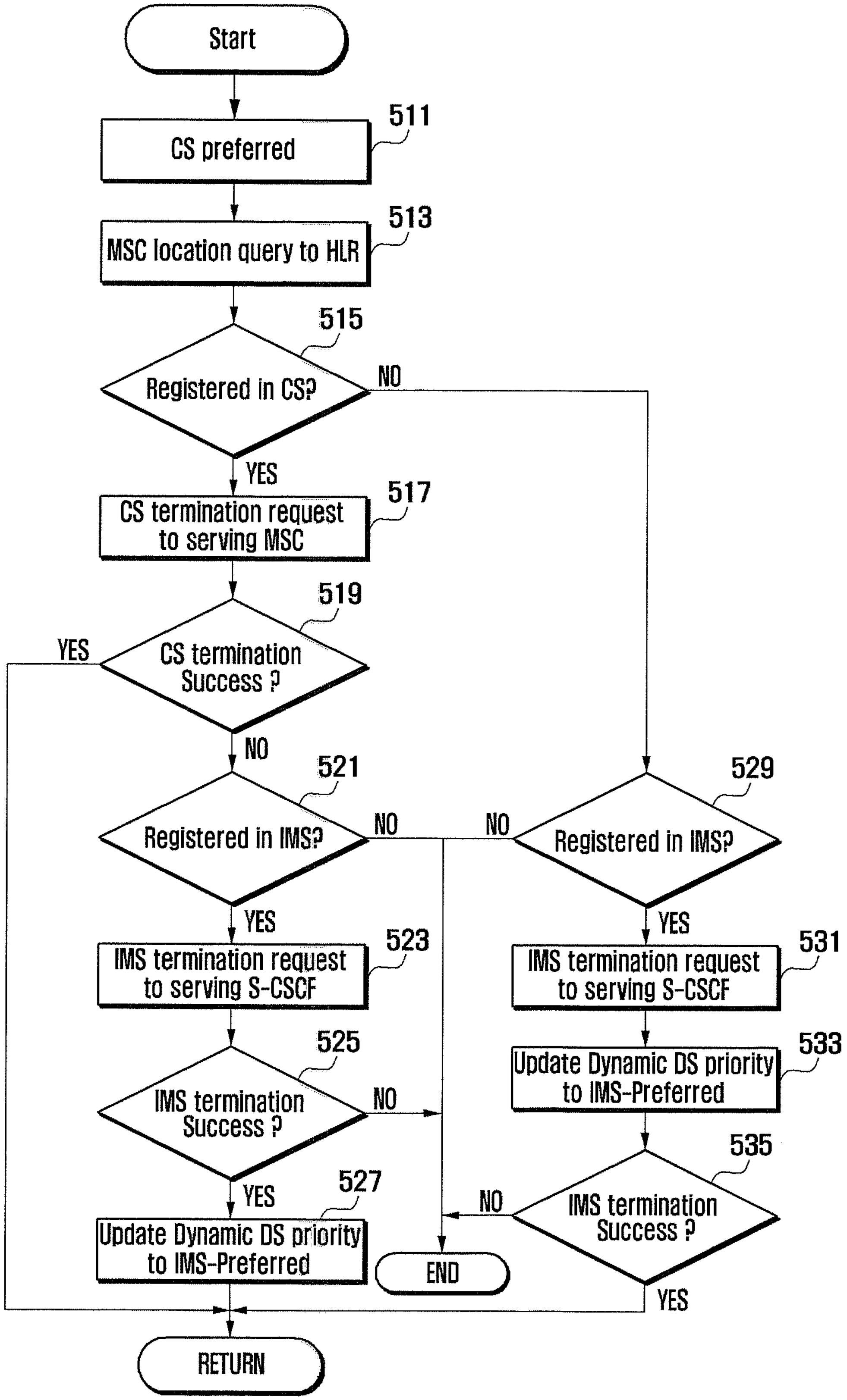
FIG. 5 illustrates a second example of the domain selecting procedure depicted in FIG. 3.

FIG. 5 is a flowchart illustrating a second example of the domain selecting procedure depicted in FIG. 3.

Referring to FIG. 5, in the domain selecting procedure of the present example, the VCC AS 119 first determines whether the dynamic DS priority of a certain terminal corresponds to the CS domain 130 (block 511). When it is determined at block 511 that the dynamic DS priority of the terminal corresponds to the CS domain 130, the VCC AS 119 requests information about an MSC 131 corresponding to the terminal from the HLR 135 of the CS domain 130 (block 513). The VCC AS 119 determines whether the terminal is in a connecting state with the CS domain 130 (block 515). That is, the VCC AS 119 acquires the MSC 131 which is connected to the terminal by communicating with the HLR 135 of the CS domain 110, such that the VCC AS 119 determines whether the terminal is in a connecting state with the CS domain 130.

Next, when it is determined at block 515 that the terminal is in a connecting state with the CS domain 130, the VCC AS 119 requests a termination of the CS domain 130 from a serving MSC 131 of the terminal (block 517). That is, the VCC AS 119 requests an establishment of the voice call corresponding to the terminal from the serving MSC 131. Then, the VCC AS 119 determines whether the termination of the CS domain 130 is successful (block 519). When it is determined at block 519 that the termination of the CS domain 130 is successful, the VCC AS 119 returns to FIG. 3. That is, the VCC AS 119 maintains the dynamic DS priority corresponding to the terminal as the CS domain 130.

When it is determined at block 519 that the terminal of the CS domain 130 is not successful, the VCC AS 119 determines whether the terminal is registered with the IMS domain 110 (block 521). The terminal connects with one of the plurality of CSCFs 111 and may perform registering with the IMS domain 110. Then, the VCC AS 119 may store connection information about the CSCF 111 corresponding to the VCC terminal 150. Consequently, the VCC AS 119 may determine based on the connection information whether the terminal is connected to the CSCF 111, that is, whether the terminal is registered with the IMS domain 110.

Next, when it is determined at block 521 that the terminal is registered with the IMS domain 110, the VCC AS 119 requests a termination of the IMS domain 110 from a serving CSCF 111 of the terminal (block 523). That is, the VCC AS 119 requests an establishment of a voice call corresponding to the terminal from the serving CSCF 111. Then, the VCC AS 119 determines whether the termination of the IMS domain 110 is successful (block 525). When it is determined at block 525 that the termination of the IMS domain 110 is successful, the VCC AS 119 updates the dynamic DS priority of the terminal as the IMS domain 110 and returns to FIG. 3 (block 527). That is, the VCC AS 119 changes the dynamic DS priority from the CS domain 130 to the IMS domain 110 corresponding to the terminal.

When it is determined at block 521 that the terminal is not registered with the IMS domain 110 or at block 525 that the termination of the IMS domain 110 is not successful, the VCC AS 119 terminates the VCC service providing procedure. That is, if the terminations of the CS domain 130 and the IMS domain 110 fail, the VCC AS 119 determines that it may be impossible to use the CS domain 130 and the IMS domain 110 corresponding to the terminal. Consequently, the VCC AS 119 does not perform anchoring for the voice call.

When it is determined at block 515 that the terminal does not connect with the CS domain 130 (block 529), the VCC AS 119 determines whether the terminal is registered with the IMS domain 110. The terminal may connect with one of the plurality of CSCFs 111 and perform registering with the IMS domain 110. The VCC AS 119 may store connection information about the CSCF 111 corresponding to the terminal. Consequently, the VCC AS 119 may determine based on the connection information whether the terminal is connected to the CSCF 111, that is, the terminal is registered with the IMS domain 110.

Next, when it is determined at block 529 that the terminal is registered with the IMS domain 110, the VCC AS 119 requests a termination of the IMS domain 110 from the serving CSCF 111 of the terminal (block 531). That is, the VCC AS 119 requests an establishment of the voice call corresponding to the terminal from the serving CSCF 111. The VCC AS 119 updates the dynamic DS priority of the terminal as the IMS domain 110 (block 533). That is, the VCC AS 119 changes the dynamic DS priority from the CS domain 130 to the IMS domain 130 corresponding to the terminal. Then, the VCC AS 119 determines whether the termination of the IMS domain 110 is successful (block 535). When it is determined at block 535 that the termination of the IMS domain 110 is successful, the VCC AS 119 returns to FIG. 3.

When it is determined at block 529 that the terminal is not registered with the IMS domain 110 or at block 535 that the termination of the IMS domain 110 is not successful, the VCC AS 119 terminates the VCC service providing procedure. That is, when the terminations of the IMS domain 110 and the CS domain 130 fail, the VCC AS 119 determines that it may be impossible to use the IMS domain 110 and the CS domain 130 corresponding to the terminal. Consequently, the VCC AS 119 does not perform anchoring for the voice call.

Figure 6:
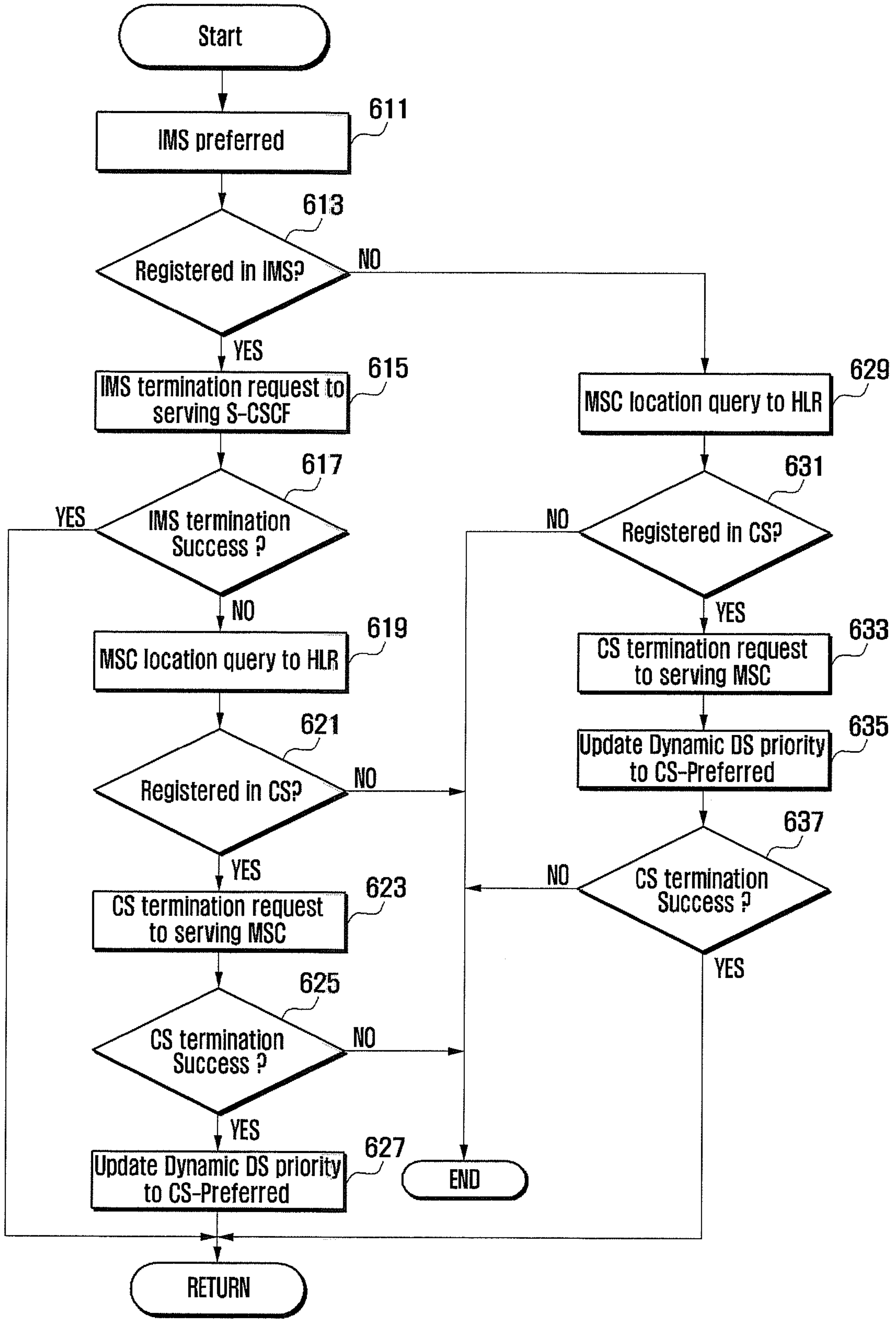
FIG. 6 illustrates a third example of the domain selecting procedure depicted in FIG. 3.

FIG. 6 is a flowchart illustrating a third example of the domain selecting procedure depicted in FIG. 3.

Referring to FIG. 6, in the domain selecting procedure of the present example, the VCC AS 119 first determines whether the dynamic DS priority of the certain terminal corresponds to the IMS domain 110 (block 611). When it is determined at block 611 that the dynamic DS priority of the terminal indicates the IMS domain 110, the VCC AS 119 determines whether the terminal is registered with the IMS domain 110 (block 613). The terminal connects with one of the plurality of CSCFs 111 and may perform registering with the IMS domain 110. The VCC AS 119 may store connection information about the CSCF 111 corresponding to the terminal. Consequently, the VCC AS 119 may determine based on the connection information whether the terminal is connected to the CSCF 111, that is, the terminal is registered with the IMS domain 110.

Next, when it is determined at block 613 that the terminal is registered with the IMS domain 110, the VCC AS 119 requests a termination of the IMS domain 110 from a serving CSCF 111 of the terminal (block 615). That is, the VCC AS 119 requests an establishment of a voice call corresponding to the terminal from the serving CSCF 111. Then, the VCC AS 119 determines whether the termination of the IMS domain 110 is successful (block 617). When it is determined at block 617 that the termination of the IMS domain 110 is successful, the VCC AS 119 returns to FIG. 3. That is, the VCC AS 119 maintains the dynamic DS priority as the IMS domain 110 corresponding to the terminal.

When it is determined at block 617 that the termination of the IMS domain 110 is not successful, the VCC AS 119 requests information about an MSC 131 corresponding to the terminal from the HLR 135 of the CS domain 110 (block 619). The VCC AS 119 determines whether the corresponding terminal is in a connecting state with the CS domain 130 (block 621). That is, the VCC AS 119 acquires the MSC 131 which is connected to the terminal by communicating with the HLR 135 of the CS domain 110, such that the VCC AS 119 determines whether the terminal is in a connecting state with the CS domain 130.

Next, when it is determined at block 621 that the terminal is in a connecting state with the CS domain 130, the VCC AS 119 requests a termination of the CS domain 130 from a serving MSC 131 of the terminal (block 623). That is, the VCC AS 119 requests an establishment of the voice call corresponding to the terminal from the serving MSC 131. Then, the VCC AS 119 determines whether the termination of the CS domain 130 is successful (block 625). When it is determined at block 625 that the termination of the CS domain 130 is successful, the VCC AS 119 updates the dynamic DS priority of the terminal as the CS domain 130 and returns to FIG. 3 (block 627). That is, the VCC AS 119 changes the dynamic DS priority from the IMS domain 110 to the CS domain 130 corresponding to the terminal.

When it is determined at block 621 that the terminal is not connected to the CS domain 130 or at block 625 that the termination of the CS domain 130 is not successful, the VCC AS 119 terminates the VCC service providing procedure. That is, if the terminations of the IMS domain 110 and the CS domain 130 fail, the VCC AS 119 determines that it may be impossible to use the IMS domain 110 and the CS domain 130 corresponding to the terminal. Consequently, the VCC AS 119 does not perform anchoring for the voice call.

When it is determined at block 613 that the terminal is not registered with the IMS domain 110, the VCC AS 119 requests information about an MSC 131 corresponding to the terminal from the HLR 135 of the CS domain 130 (block 629). The VCC AS 119 determines whether the terminal is in a connecting state with the CS domain 130 (block 631). That is, the VCC AS 119 acquires the MSC 131 which is connected to the terminal by communicating with the HLR 135 of the CS domain 110, such that the VCC AS 119 determines whether the terminal is in a connecting state with the CS domain 130.

Next, when it is determined at block 631 that the terminal is in a connecting state with the CS domain 130, the VCC AS 119 requests a termination of the CS domain 130 from the serving MSC 131 of the terminal (block 633). That is, the VCC AS 119 requests an establishment of the voice call corresponding to the terminal from the serving MSC 131. Then, the VCC AS 119 updates the dynamic DS priority of the terminal as the CS domain 130 (block 635). That is, the VCC AS 119 changes the dynamic DS priority from the IMS domain 110 to the CS domain 130 corresponding to the terminal. Then, the VCC AS 119 determines whether the termination of the CS domain 130 is successful (block 637). When it is determined at block 625 that the termination of the CS domain 130 is successful, the VCC AS 119 returns to FIG. 3.

When it is determined at block 632 that the terminal is not connected to the CS domain 130 or at block 637 that the termination of the CS domain 130 is not successful, the VCC AS 119 terminates the VCC service providing procedure. That is, if the terminations of the CS domain 130 and the IMS domain 110 fail, the VCC AS 119 determines that it may be impossible to use the IMS domain 110 and the CS domain 130 corresponding to the terminal. Consequently, the VCC AS 119 does not perform anchoring for the voice call.

According to the second and third examples of this embodiment of the present disclosure, the VCC AS 119 may set the dynamic DS priority according to the domain selection result as shown in Table 2 below.

TABLE 2

| Dynamic DS priority before domain selection | Domain selection result: Registration status IMS | CS | Trial result | Dynamic DS priority after domain selection |
|---|---|---|---|---|
| IMS preferred | ○ | ○/X | IMS success or failure | IMS preferred |
| | ○ | ○ | CS success | CS preferred |
| | X | ○ | CS success or failure | CS preferred |
| | X | X | Failure | IMS preferred |
| CS preferred | ○/X | ○ | CS success or failure | CS preferred |

TABLE 2-continued

| Dynamic DS priority before domain selection | Domain selection result | | | Dynamic DS priority after domain selection |
|---|---|---|---|---|
| | Registration status | | | |
| | IMS | CS | Trial result | |
| | ○ | ○ | IMS success | IMS preferred |
| | ○ | X | IMS success or failure | IMS preferred |
| | X | X | failure | CS preferred |

For example, when the dynamic DS priority is set as the IMS domain 110, the VCC AS 119 first selects the IMS domain 110 corresponding to the terminal. When the termination of the IMS domain 110 is successful corresponding to the terminal, the VCC AS 119 maintains the dynamic DS priority of the terminal as the IMS domain 110. Alternatively, when the termination of the IMS domain 110 corresponding to the terminal fails, the VCC AS 119 reselects the CS domain 130 corresponding to the terminal. Then, when the terminal of the CS domain 130 is successful corresponding to the terminal, the VCC AS 119 changes the dynamic DS priority of the terminal from the IMS domain 110 to the CS domain 130. When the terminations of the IMS domain 110 and the CS domain 130 fail, the VCC AS 119 maintains the dynamic DS priority of the terminal as the IMS domain 110.

When the dynamic DS priority of the terminal is set as the CS domain 130, the VCC AS 119 first selects the CS domain 130 corresponding to the terminal. Then, the termination of the CS domain 130 is successful, and the VCC AS 119 maintains the dynamic DS priority of the terminal as the CS domain 130. Alternatively, when the termination of the CS domain 130 corresponding to the terminal fails, the VCC AS 119 reselects the CS domain 130 corresponding to the terminal. Then, when the terminal of the IMS domain 110 is successful corresponding to the terminal, the VCC AS 119 changes the dynamic DS priority of the terminal from the CS domain 130 to the IMS domain 110. When the terminations of the CS domain 130 and the IMS domain 110 fail, the VCC AS 119 maintains the dynamic DS priority of the terminal as the CS domain 130.

Although it has been described in embodiments of the present disclosure that either the IMS domain 110 or the CS domain 130 is checked according to the dynamic DS priority of the terminal, the present disclosure is not limited thereto. That is, considering a user preference or an operator policy set corresponding to a terminal as well as the dynamic DS priority of the terminal, the VCC AS 119 may determine either the IMS domain 110 or the CS domain 130.

Although it is described in embodiments of the present disclosure that the dynamic DS priority of the terminal is set according to the domain selection result by the VCC AS 119, the present disclosure is not limited thereto. That is, the VCC AS 119 may flexibly set the dynamic DS priority of the terminal according to the result of using the IMS domain 110 and the CS domain 130 by the terminal as well as the domain selecting result.

For example, by selecting either the IMS domain 110 or the CS domain 130 for processing a call originated from the terminal, the VCC AS 119 may compare it with the dynamic DS priority of the terminal. Then, when it is equal to the dynamic DS priority of the terminal, the VCC AS 119 may maintain the dynamic DS priority of the terminal. Further, when it is different from the dynamic DS priority of the terminal, the VCC AS 119 may change the dynamic DS priority of the terminal.

Also, when sensing a domain switching corresponding to the terminal for example, a handover between the IMS domain 110 and the CS domain 130, the VCC AS 119 may change the dynamic DS priority of the terminal. For example, when the dynamic DS priority of the terminal is the IMS domain 110, the VCC AS 119 senses the switching from the IMS domain 110 to the CS domain 130, and changes the dynamic DS priority of the terminal to the CS domain 130. When the dynamic DS priority of the terminal is the CS domain 130, the VCC AS 119 senses the switching from the CS domain 130 to the IMS domain 110, and changes the dynamic DS priority of the terminal to the IMS domain 110.

Although it is described in embodiments of the present disclosure that the VCC AS 119 sets the dynamic DS priority of the terminal and maintains or changes the dynamic DS priority according to the domain selection result by the VCC AS 119, the present disclosure is not limited thereto. That is, the VCC AS 119 stores and manages a static preferred domain as well as the dynamic DS priority. The static preferred domain may be set by a user or an operator. When a predetermined time period has passed since the determination to maintain or change the dynamic DS priority of the terminal, the VCC AS 119 may maintain or change the dynamic DS priority of the terminal corresponding to the static preferred domain. The predetermined time period may be set by an operator.

According to embodiments of the present disclosure, by considering the number of determination matters less than in previous embodiments, the VCC AS 119 may select either the IMS domain 110 or the CS domain 130 corresponding to the terminal. The determination matters include whether a terminal is registered with the IMS domain 110, whether a terminal is connected to the CS domain 130, a dynamic DS priority of a terminal, and a set according to a user preference or an operator policy.

According to the present disclosure, a voice call establishment for a terminal is initiated by first using a domain set in a dynamic DS priority of the terminal in a mobile communication system. Thus, it is possible in a mobile communication system to increase the domain selecting completion rates for a voice call service corresponding to a terminal. Therefore, the amount of time that a voice call establishment for a terminal is retried can be reduced in a mobile communication system. That is, by effectively providing a voice call service to a terminal in a mobile communication system, a waste of resources for the voice call service may be prevented.

A method and an apparatus for selecting a domain for a voice call continuity service in a mobile communication system according to the present disclosure initiate a voice call establishment for a terminal using first the most recent domain which is used for a voice call.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of selecting a domain of an application server in order to support a voice call continuity service in a mobile communication system including an IP Multimedia Subsystem (MS) domain and a Circuit Switched (CS) domain, the method comprising:

selecting either the IMS domain or the CS domain according to a dynamic domain selection priority which is predetermined corresponding to a terminal after a voice call for the terminal is received; and anchoring the received voice call corresponding to the terminal through the selected domain, wherein selecting either the IMS domain or the CS domain comprises:

requesting a termination to the selected domain; and after the termination is completed in the selected domain, maintaining the dynamic domain selection priority of the selected domain.

2. The method of claim 1, wherein selecting either the IMS domain or the CS domain comprises:

after the termination fails in the selected domain, reselecting the other of the IMS domain and the CS domain;

requesting a termination to the reselected domain; and after the termination is completed in the reselected domain, changing the dynamic domain selection priority from the selected domain to the reselected domain.

3. The method of claim 1, wherein requesting a termination to the selected domain is performed when the terminal is connected to the selected domain.

4. The method of claim 3, wherein selecting either the IMS domain or the CS domain comprises reselecting the other of the IMS domain and the CS domain when the terminal is not connected to the selected domain.

5. The method of claim 1, wherein selecting either the IMS domain or the CS domain according to a dynamic domain selection priority is based on a user preference and an operation policy set corresponding to the terminal.

6. An apparatus for selecting a domain of an application server in order to support a voice call continuity service in a mobile communication system including an IP Multimedia Subsystem (IMS) domain and a Circuit Switched (CS) domain, the apparatus comprising:

a selector configured to select either the IMS domain or the CS domain according to a dynamic domain selection priority which is predetermined corresponding to a terminal after a voice call for the terminal is received; and an anchoring unit configured to anchor the received voice call corresponding to the terminal through the selected domain, wherein the selector is configured to request a termination to the selected domain and maintain the dynamic domain selection priority of the selected domain after the termination is completed in the selected domain.

7. The apparatus of claim 6, wherein the selector is configured to reselect the other of the IMS domain and the CS domain after the termination fails in the selected domain, request a termination to the reselected domain, and change the dynamic domain selection priority from the selected domain to the reselected domain after the termination is completed in the reselected domain.

8. The apparatus of claim 6, wherein the selector is configured to request the termination to the selected domain when the terminal is connected to the selected domain.

9. The apparatus of claim 8, wherein the selector is configured to reselect the other of the IMS domain and the CS domain when the terminal is not connected to the selected domain.

10. The apparatus of claim 6, wherein the IMS domain comprises a packet switched domain.

11. The apparatus of claim 6, wherein the apparatus is communicatively coupled to a home subscriber server in the IMS domain.

12. The apparatus of claim 6, wherein the selector is configured to select either the IMS domain or the CS domain according to the dynamic domain selection priority based on a user preference and an operation policy set corresponding to the terminal.

13. A system for selecting a domain of an application server in order to support a voice call continuity service in a mobile communication system, the system comprising:

an IP Multimedia Subsystem (IMS) domain;

a Circuit Switched (CS) domain;

a selector configured to select either the IMS domain or the CS domain according to a dynamic domain selection priority which is predetermined corresponding to a terminal after a voice call for the terminal is received; and an anchoring unit configured to anchor the received voice call corresponding to the terminal through the selected domain, wherein the selector is configured to request a termination to the selected domain, and maintain the dynamic domain selection priority of the selected domain when the termination is completed in the selected domain.

14. The system of claim 13, wherein the selector is configured to reselect the other of the IMS domain and the CS domain after the termination fails in the selected domain, request a termination to the reselected domain, and change the dynamic domain selection priority from the selected domain to the reselected domain after the termination is completed in the reselected domain.

15. The system of claim 13, wherein the selector is configured to request the termination to the selected domain when the terminal is connected to the selected domain.

16. The system of claim 15, wherein the selector is configured to reselect the other of the IMS domain and the CS domain when the terminal is not connected to the selected domain.

17. The system of claim 13, wherein the IMS domain comprises a packet switched domain.

18. The system of claim 13, further comprising a home subscriber server coupled to the selector in the IMS domain.

19. The system of claim 13, further comprising a call session control function (CSCF) coupled to the selector in the IMS domain.

20. The system of claim 13, wherein the selector is configured to select either the IMS domain or the CS domain according to the dynamic domain selection priority based on a user preference and an operation policy set corresponding to the terminal.

* * * * *